United States Patent
Gerdes

(10) Patent No.: US 6,209,746 B1
(45) Date of Patent: Apr. 3, 2001

(54) TANK CAP WITH FREE TRAVEL

(75) Inventor: Ralf Gerdes, Kerpen-Sindorf (DE)

(73) Assignee: Gerdes GmbH, Kerpen-Sindorf (DE)

( * ) Notice: Subject to any disclaimer, the term of this patent is extended or adjusted under 35 U.S.C. 154(b) by 0 days.

(21) Appl. No.: 09/524,456

(22) Filed: Mar. 10, 2000

(30) Foreign Application Priority Data

Mar. 10, 1999 (DE) .............................. 199 10 684

(51) Int. Cl.$^7$ ............................ B65D 55/16; B65D 41/04
(52) U.S. Cl. ........................ 220/288; 220/293; 220/375; 220/DIG. 33
(58) Field of Search .................................... 220/288, 293, 220/DIG. 32, DIG. 33, 395, 86.2, 303, 304

(56) References Cited

U.S. PATENT DOCUMENTS

| | | | |
|---|---|---|---|
| 3,715,075 | * 2/1973 | Blau et al. | 220/DIG. 33 X |
| 4,809,869 | * 3/1989 | Cosgrove et al. | 220/288 |
| 5,435,358 | 7/1995 | Kempka et al. | . |
| 5,462,190 | * 10/1995 | Lienhart et al. | 220/375 |
| 5,732,841 | 3/1998 | Jocic et al. | . |
| 5,732,842 | 3/1998 | Krause et al. | . |
| 5,974,806 | 8/1998 | Harris et al. | . |
| 6,076,695 | * 6/2000 | Palvoelgyi et al. | 220/DIG. 33 X |

* cited by examiner

Primary Examiner—Nathan J. Newhouse
(74) Attorney, Agent, or Firm—Fulwider Patton Lee & Utecht, LLP

(57) ABSTRACT

The invention relates to a tank cap for closure of a fuel tank, which can be screwed onto a filler neck and has an inner closure element as well as a cap element and is mounted so as to rotate against the force of a return spring around an angle of free travel that is limited by a first stop and a second stop. The return spring is arranged between the closure element and the cap element so that the longitudinal axis of the return spring lies in a plane that is perpendicular to the axis of rotation of the tank cap.

15 Claims, 1 Drawing Sheet

TANK CAP WITH FREE TRAVEL

This application claims priority under the Paris Convention based on German Patent Application No. 199 10 684.3 filed Mar. 10, 1999.

BACKGROUND OF THE INVENTION

This invention relates to a tank cap for the fuel tank of a vehicle, which seals the fuel tank from the exterior of the vehicle unless the tank cap is opened for the purpose of, for example, adding fuel. More particularly, the invention relates to a tank cap having features which optimize space requirements and which enhance manufacturability and improve the safety of the finished, installed product.

Conventional tank caps for closing the filler neck of a vehicle fuel tank usually include a closure member for closing the mouth of the filler neck and a handle or cap element which moves relative to the closure member to permit a user to install or remove the tank cap. It is known to provide tank caps that can be inserted and removed without having to rotate the cap for through multiple 360° rotations. It also is known to provide a tank cap that is installed or removed with less than a full 360° rotation. This feature not only is convenient to the user, but a tank cap with an angle of free travel that is something less than 360°, e.g., a angle in the range of between 90° and 270° and preferably 180°, is less likely to become dislodged to expose the fuel tank in the event of an accident when the body of the vehicle is impacted or deformed. Owing to the free travel feature, even when something is forced onto the cap element of the tank cap in a substantially linear movement, the cap element will rotate or give to some degree without the result of dislodging the tank cap from the filler neck of the tank and, thus, a hazard is avoided that otherwise would be presented by escaping fuel. In some countries, automobile manufacturers are required by law to provide tank caps characterized by an angle of free travel.

U.S. Pat. No. 5,794,806 discloses one manner of implementing a free travel feature. This tank cap has a return spring, configured as a torsion spring, between the cap element and the closure element which is attached at its corresponding ends to rotate in unison on the cap element and on the closure element. During assembly of the two components, the untightened return spring initially is inserted into one of the two components and the other component then is positioned on the component into which the spring has been inserted. The spring tension that occurs when the cap element is rotated relative to the closure element is bounded by reason of a first stop, against which the cap element is held, and a second stop, which limits the maximum angle of free travel through which one of the components can rotate with respect to the other.

This implementation of the free travel feature can result in a less than optimum design, however, because in this tank cap the torsion spring is arranged in a plane that is perpendicular to the plane of rotation of the cap element. Thus, the tank cap must be long enough or tall enough to accommodate the length or height of the spring. A tank cap of the type disclosed in U.S. Pat. No. 5,794,806 also can be difficult to assemble and to subsequently inspect. For example, assembly of such tank caps frequently still is accomplished manually, and it is possible for the spring to be incorrectly inserted during assembly, such that the spring force will act in the opposite, and therefore in precisely the wrong, direction.

If an error is made in the assembly of a tank cap of this type, the error can prove to be difficult to detect, because both components nevertheless still are rotatable with respect to each other, albeit in the direction from the second stop to the first stop rather than in the correct direction from the first stop to the second stop. The rapid check that usually is performed in the course of industrial mass production of tank caps is not likely to reveal this sort of error, and the problem is not likely to be discovered until an attempt is made to install the tank cap to seal the filler neck of the fuel tank. Efforts to more thoroughly inspect the tank cap at the time of assembly of the cap element and the closure element would increase the time required for the inspection, as the inspector necessarily not only would have to check whether the cap element is rotatable under a spring load, but also whether the direction of rotation is the proper direction.

What has been needed and heretofore unavailable is a tank cap that is designed to make efficient use of space and can be manufactured cost effectively, that can be installed with the least possible risk of error, and that subsequently can be timely and easily inspected in order to detect any assembly errors which do occur. The present invention satisfies these needs.

SUMMARY OF THE INVENTION

The present invention is directed to a tank cap including a cap element which is free to move through an angle of rotation or an angle of free travel with respect to a closure element by reason of a return spring, which return spring is arranged between the closure element and the cap element such that the longitudinal axis of the return spring lies in a plane that intersects the axis of rotation of the tank cap, and the return spring further is arranged at an angle to the axis of rotation on the cap element.

This return spring, which can be a tension spring or a compression spring, correctly is installed under tension or compression and, as such, it is not feasible to install the spring such that it has an incorrect direction of spring force. Thus, the installation can be checked easily and quickly, because there are only two possible conditions. That is, the assembly either exhibits spring tension (correct assembly) or it exhibits no spring tension (incorrect assembly). Unlike tank caps of the prior art, in which the springs can be assembled such that the spring force will act in the wrong direction, inspection of a tank cap according to the present invention can be restricted to testing whether spring loading actually is present.

The return spring can be arranged at any angle relative to the axis of rotation of the cap element, but is preferably arranged in a plane perpendicular to the axis of rotation, i.e., the return spring is arranged in the plane of rotation of the cap element or a plane that is parallel to it. A perpendicular plane is understood here to mean a plane that is intersected by the axis of rotation at a right angle. The return spring can be any type of spring that can store and release tensile or compressive forces. A simple coil spring or a rubber spring is preferred.

The spring force necessary need not be very great, because the force must only be sufficient to return the unstressed tank cap to its resting position. Thus, the diameter of the spring can be kept small and therefore the space requirements are not excessive in the direction of the axis of rotation of the cap element. The amount of space that the return spring requires in the transverse direction may be greater than the amount of space that is required with torsion springs which are disposed in a plane that is perpendicular to the plane of rotation, however, this is not a design concern because there is sufficient space available in this direction anyway.

The closure element to be used in the filler neck preferably is designed to be rotationally symmetric, however deviations from this design also are contemplated. The cap element can be pivotally attached to the closure element by a pivot pin at the center of the closure element which pivot pin is received by a receiving hole in the center of the cap element. The return spring, which desirably is a tension spring, is guided in at least the tightened state in a more or less circular arc around the pivot pin.

Under some circumstances, disposing a spring about a pivot pin in such manner might result in restricting the number of effective windings of the spring due to friction force. In order to avoid rendering ineffective any of the windings of the spring due to friction force, a deflection sleeve preferably is provided. The deflection sleeve has a center hole through which the pivot pin can extend, and the return spring is guided around the periphery of the deflection sleeve in order to discourage or prevent the undesirable transfer or loss of forces from the spring. The deflection sleeve promotes uniform distribution of the tension load or compression load along the entire length of the return spring and thus, in the case of a coil spring, uniform distribution of the tension load across each of the windings can be realized.

The free travel rotation of the cap element relative to the closure element is limited by a pre-selected design range to a desired angle such that, once this range of free travel as been traversed, the tank cap loosening or opening force is transferred from the cap element to the closure element. Preferably, the closure element is provided with a guide pin which protrudes in the direction of the cap element and which rides in a guide channel in the closure element, the guide pin thereby following the movement of the cap element through the range of free travel. The first and second stops which establish the degree to which the cap element can rotate relative to the closure element thus are defined by the respective ends of the guide channel. The guide channel is substantially in the form of an arc segment of a circle, such that the angle that characterizes the arc establishes the path of the free travel.

The cap element preferably includes an inner cap portion and an outer cap portion connected to the inner cap portion, wherein the inner cap portion has the guide pin and is disposed about the pivot pin. The means by which one end of the return spring is fixedly attached to the assembly can be provided on either the inner cap portion or the outer cap portion, but preferably this fastener is located on the outer cap portion. It then is possible to provide a single return spring, because the forces ultimately being transferred to the closure element need not be very large. Alternatively, though, several springs might be provided and which can be arranged, for example, in a distribution around the periphery of the pivot. Multiple springs in the form of tension or compression springs also can be provided to support a return spring and can be arranged so that the longitudinal axes thereof lie in a plane that is at a right angle to the axis of rotation of the cap element.

The closure element preferably also has at least two main parts, namely, a lower neck insert that is designed to be inserted and screwed into the filler neck of the fuel tank, and an upper cap-bearing portion that is connected to the neck insert. The preferred design of the closure element includes a feature that prevents the tank cap from being over-tightened when it is installed to seal off the fuel tank from exposure to the exterior of the vehicle. This feature preferably is implemented by providing the neck insert with a locking sleeve which receives the cap-bearing element and which prevents the cap-bearing element from moving axially to any significant degree relative to the neck insert but which allows the cap-bearing element to rotate against the force of a spring-loaded ratchet connection. The ratchet connection blocks when the cap element is rotated in the opening direction of the tank cap, but slides through after a nominal amount of torquing force has been surpassed when the cap is rotated in the closing direction, so that if a user continues to try to turn the cap after the cap is installed, the user's efforts will have no effect.

This sort of ratchet connection may be provided, for example, by positioning a tightened spring between the ends of an expansion element. The far ends of the expansion element, i.e., the ends of the expansion element which are opposite the point of attachment to the tightened spring, are provided with wedge-shaped hook elements that each have one surface that is beveled or rounded. The inner surface of the locking sleeve of the neck insert is provided with complementary wedge-shaped hook elements, i.e., wedge-shaped hook elements that are reversed in orientation or 180° out of phase with the wedge-shaped hook elements on the expansion element. If a user attempts to over-tighten the tank cap when replacing it after refueling, for example, the spring-loaded wedge-shaped hook elements on the expansion element will be caused to slide over the wedge-shaped hook elements on the inner surface of the locking sleeve after a nominal torquing force is exceeded, during which time the force necessary to compress the spring can be transferred by the wedge surfaces. The ratchet connection thus slides through when such nominal closing force is surpassed and the force directed in the direction of the spring is equal to the spring force, which prevents the tank cap from being tightened to too great a degree.

When the tank cap is being rotated in the direction to open it and to gain access to the filler neck of the fuel tank, parallel surfaces of the wedge-shaped element of the expansion elements and of the wedge-shaped elements on the inner surface of the locking sleeve lie against each other, and thus no significant force components in the axial direction of the spring can be created. In this configuration, the wedge-shaped elements cannot slide over each other and the entire torque of the cap element is transferred via the cap-bearing element to the neck insert, allowing the tank cap to be rotated to the degree necessary to open it.

The tank cap further may be provided with a holding band, to prevent it from being permanently detached from the vehicle and lost, even if the user should drive away after refueling without replacing the tank cap. The holding band may be composed of rubber or of a solvent-resistant plastic and preferably includes a strap that is mounted at one end thereof on the tank cap so as to be rotatable and which is connected at the other end thereof to the filler neck of the fuel tank or to some other part of the vehicle.

For example, the holding band may be attached to the tank cap in the upper region of the neck insert, facing the cap element, the strap of the holding band being large enough to permit the whole of the neck insert to be inserted into the filler neck under tension of the elastic band. To prevent the strap from moving axially and, thus, from being dislodged from the neck insert, the neck insert preferably is provided with a continuous recess or groove or the like in the area in which the strap is to be attached to the tank cap.

Other features and advantages of the present invention will become more apparent from the following detailed description of the invention, when taken in conjunction with the accompanying exemplary drawings.

DETAILED DESCRIPTION OF THE PREFERRED EMBODIMENTS

With reference to FIGS. 1 through 4, there is illustrated a tank cap according to the present invention, which ordinarily is used to close the fuel tank of a passenger car or other vehicle. The tank cap has a closure element 1 and a cap element 2, the cap element 2 serving as the handle for the tank cap and which extends and protrudes from the filler neck of the fuel tank for easy access by the user, the cap element adapted to rotate to open or to close the tank cap. The closure element 1, which is connected to the cap element 2, is intended to be inserted into the filler neck and fastened there, such as by fastener(s) 12 or screw threads disposed on the outer surface of the closure element which are designed to engage complementary structure in the filler neck. The closure element is provided with a seal 11 for reliably sealing the fuel tank with respect to the exterior of the vehicle, preventing release from the vehicle of volatile substances.

Figure 1:
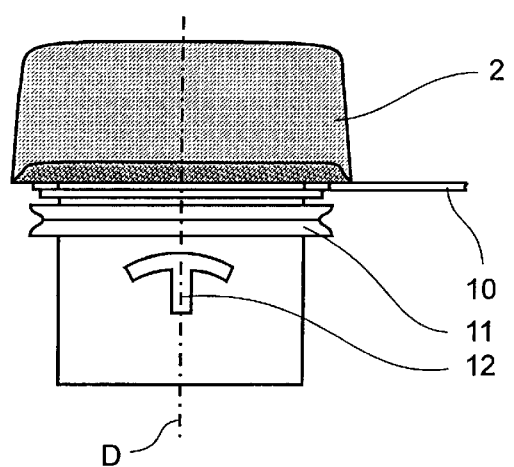
FIG. 1 is an elevational view of a tank cap embodying features of the invention.
Figure 2:
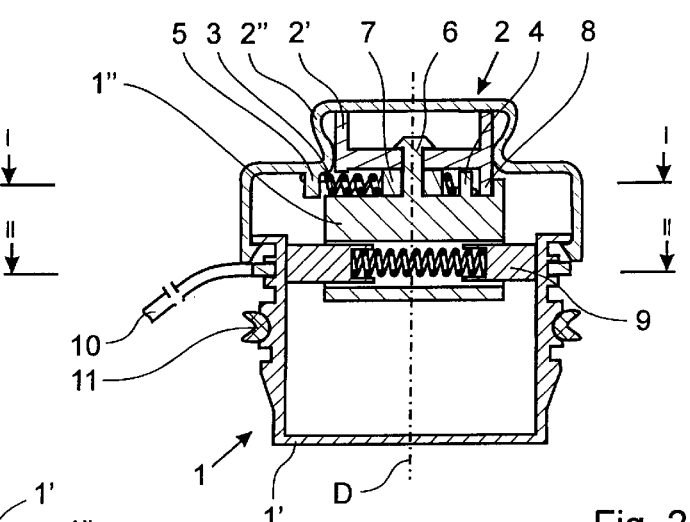
FIG. 2 is an elevational, cross-sectional view of the tank cap of FIG. 1.

Referring to FIG. 2, the tank cap of FIG. 1 is illustrated in cross-section. The cap element 2 has an inner cap portion 2' and an outer cap portion 2", the outer cap portion being designed to serve as a handle and having a shape that is suitable for a user to grip. Both the inner cap portion 2' and the outer cap portion 2" may be formed from a plastic, preferably a plastic that is fire-resistant. The inner cap portion 2' is substantially rotationally symmetric in shape, and is connected to the closure element via a pivot pin 6. The design of this connection is such that the cap element 2 can be rotated relative to the closure element 1 by an angle of free travel against the force of a return spring 3.

To establish and limit the angle of free travel, the inner cap portion 2' is provided with a guide pin 8, which is guided in a guide channel that is disposed in the top surface of the closure element 1 and, preferably, in the cap-bearing element 1" of the closure element 1. The guide channel is arranged such that the center of the circle it would more or less define is concentric with the axis of rotation D of the cap element 2 and is in the shape of a substantially circular arc. Each end of the guide channel serves as a stop for the guide pin and thus serves to limit the mobility of the guide pin and therefore to limit the range of free travel of the cap element with respect to the closure element.

The tank cap has a pre-defined resting position which is dictated by the return spring 3. The cap element 2 is held in the resting position by the force of the return spring 3, in which resting position the guide pin 8 rests against or abuts a first stop. To open the tank cap, the cap element 2 initially is rotated through the angle of free travel, during which time the closure element 1 remains immobile. Only further rotation of the cap element 2 then will cause the closure element 1 to rotate and thus will cause the fastener(s) 12 to loosen from the filler neck. The angle of free travel preferably is at least 90°, so that unwanted loosening of the tank cap in the event of an accident will be discouraged.

The return spring 3 preferably is a coil spring, and is attached at one of the ends thereof to a mobile fastener that is affixed to the inner cap portion 2', i.e., this fastener can rotate with the cap element 2. The opposite end of the return spring 3 is connected to the closure element 1 with a fixed fastener 4, i.e., this fastener is will not rotate relative to the inner cap portion 2'.

The closure element 1 has at least two components, namely, a neck insert 1' and a cap-bearing element 1". The neck insert 1', at least in the upper region thereof, is designed to be sleeve-like. Provided on the outer surface of the neck insert 1' are the fastener(s) 12 for releasably engaging the filler neck of the fuel tank when the tank cap is installed in the closed position. Also provided on the outer surface of the neck insert 1' is a seal 11 for preventing release of vapors or other substances from the fuel tank when it is desired that the tank cap remain closed. The cap-bearing element 1" connects the closure element 1 to the inner cap portion 2' of the cap element 2. The cap-bearing element 1" has the guide channel which limits the path of the guide pin 8, and the cap-bearing element 1" also has the pivot pin 6 about which the inner cap portion 2' is mounted. The inner cap portion 2' thus is concentric with the axis of rotation D of the cap element 2 and with the center of the closure element 1. The pivot pin 6 is designed such that it appears mushroom-like on the end thereof which extends through and into the inner cap portion 2', and exhibits a rectangular bottom in this mushroom-like end region which is provided to guard against the cap element 2 from becoming undesirably loosened, in an axial direction, from the closure element 1. In order to facilitate assembly, it is preferred that at least one of the inner cap portion 2' and the cap-bearing element 1" be formed from an elastic material, so that the pivot pin 6 with its mushroom-like head can be inserted easily into the receiving hole in the inner cap portion 2'. To encourage uniform distribution of the forces among and across each of the windings of the return spring 3, a deflection sleeve 7 is provided, which is mounted on the cap-bearing element 1" about the pivot pin 6 so as to be capable of rotation about the pivot pin 6 between the inner cap portion 2' and the cap-bearing element 1". This deflection sleeve 7 may be a simple disk with a center hole that prevents transfer of tangential friction forces from the return spring 3 to the pivot pin 6.

The outer cap portion 2" is connected to the inner cap portion 2' by press fitting, and it is contemplated that this press fit might be enhanced by application of an adhesive such as glue or through a weld connection. Additionally, the outer cap portion 2" preferably is bell-shaped with a lower edge that protrudes inwardly, and which engages behind a flange-like upper end region of the neck insert 1'. By protecting the inner cap portion 2' with the outer cap portion 2" and through interaction of the inwardly protruding lower edge with the flange-like region, undesirable separation of the cap element 2 from the closure element 1 is discouraged.

In order to more clearly depict the tank cap of the present invention, the inner region of the neck insert 1' is not shown in FIG. 1. This inner region ordinarily contains a vent valve for the fuel tank and an additional bearing associated with the cap-bearing element 1". The neck inserted is provided with a holding band 10 and with a seal 11. The holding band is comprised at least in part of a flexible material, and it keeps the tank cap with the vehicle when the tank cap has been opened and detached from the filler neck so that it cannot be lost.

Figure 3:
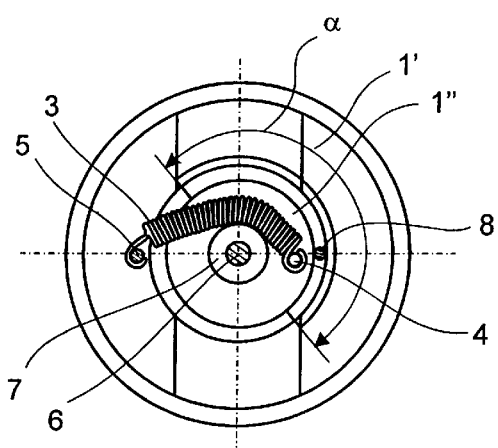
FIG. 3 is a plan, cross-sectional view of the tank cap of FIG. 2 taken along the lines I—I.

Referring now to FIG. 3, in which a section along the lines I—I of FIG. 2 is shown, the return spring 3 is coupled at one of its ends to a mobile fastener 5 located on the cap element 2 and the other of its ends is coupled to a fixed fastener 4 located on the closure element 1. In order to permit such coupling, each end of the coil spring is provided with an eye, which can be open or closed, and which is arranged at approximately a right angle to the windings of the spring. The mobile fastener 5 and the fixed fastener 4 thus can function as pins or bolts which protrude at right angles from the corresponding components of the spring into which the eyes of the return spring are suspended. To discourage the spring from slipping relative to the fasteners, the fasteners can be provided with small grooves or with thickened end regions or heads.

The return spring 3 is positioned around a deflection sleeve 7, which is mounted so as to be rotatable about the pivot pin 6. The angle of free travel or angle of rotation is established by the stops created by the ends of the guide channel through which the guide pin 8 is guided. A radial force component of the return spring 3 at the location of the mobile fastener 5 is essential for the spring 3 to perform the return function. Especially at larger angles of free travel , this component is further increased by the forced deflection of the deflection sleeve 7, and a dead point is avoided with the opposing mobile fastener 5 and fixed fastener 4, the return spring running linearly in between the two.

Figure 4:
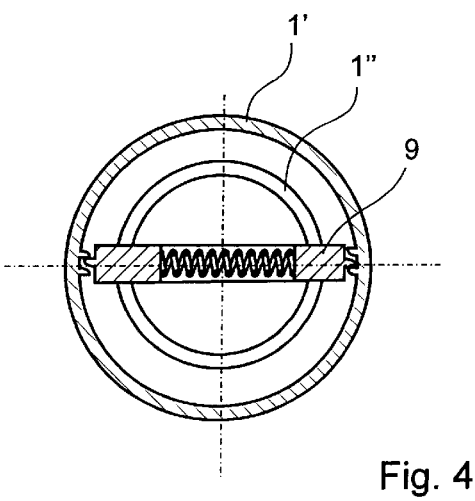
FIG. 4 is a plan, cross-sectional view of the tank cap of FIG. 2 taken along the lines II—II.

In FIG. 4, a section taken along the lines II—II of FIG. 2 is shown to illustrate the ratcheting connection 9 between the neck insert 1' and the cap-bearing element 1", which ratcheting connection prevents the tank cap from being over-tightened.

Preferably, the ratcheting connection 9 is comprised of an expansion element arranged in the across the diameter and in the center of the neck insert 1'. An inner or center portion of the expansion element includes a tightened spring, which is disposed between and which is attached at each of the ends thereof to outer portions of the expansion element. The far ends of the outer portions of the expansion element, i.e., the ends furthest away from the inner or center portion, are provided with wedge-shaped hook elements. These wedge-shaped hook elements have one surface that is substantially straight and an opposite-facing surface that is beveled or rounded. By reason of the spring in the inner or center portion, the wedge-shaped hook elements of the expansion element are positioned and biased against an inner surface of a locking sleeve of the neck insert 1'.

The inner surface of the locking sleeve of the neck insert 1' has wedge-shaped elements which complement the wedge-shaped elements of the expansion element and which have the same cross-section as the wedge-shaped hook elements of the expansion element. However, the wedge-shaped elements of the locking sleeve are oriented exactly opposite to or reversed from the wedge-shaped elements of the expansion element. Thus, the wedge-shaped elements of the locking sleeve protrude inwardly and are in spring-engagement with the wedge-shaped elements of the outer portions of the expansion element. By virtue of this arrangement, the wedge-shaped elements of the locking sleeve will slide over the wedge-shaped elements of the expansion element when the tank cap is rotated in one direction, namely, the direction the tank cap is turned to close it, but the wedge-shaped elements of the locking sleeve will not give relative to the wedge-shaped elements of the expansion element when the tank cap is rotated in the opposite direction, namely the direction the tank cap is turned to open it. More particularly, when the tank cap is being rotated to close it, and after a nominal torquing force has been exceeded, further torque applied to the cap element 2 is converted at the rounded surfaces of the wedge-shaped hook elements on the outer portions of the expansion element to a force component which is effective along the center line of the spring. When this force exceeds the spring force, the wedge-shaped elements of the expansion element retract centrically towards the spring and the cap-bearing element 1' thus is free to rotate relative to the neck insert 1'. This sliding coupling limits the maximum torque that can be applied with any effect to the connection of the tank cap to the filler neck by the fastener(s) 12 and, thus, makes it impossible to close the tank cap too tightly.

When however the tank cap is rotated in the opposite or in the opening direction, the wedge-shaped hook elements of the outer portions of the expansion element present a surface to the opposing wedge-shaped hook elements of the locking sleeve that is parallel to those neck insert elements and this surface also is parallel to the center line of the spring. Thus, when torque is translated through when the user turns the tank cap to open it, no force component axial to the center line of the spring is created and no force to compress the spring can develop, as the ratcheting connection 9 transfers the entire torque from the cap element 2 to the neck insert 1'.

It will be apparent from the foregoing that, while particular forms of the invention have been illustrated and described, various modifications can be made without departing from the spirit and scope of the invention. Accordingly, it is not intended that the inventions be limited, except as by the appended claims.

What is claimed is:

1. A tank cap for a vehicle, which can be inserted into and sealed with a filler neck of the fuel tank, comprising:

a closure element;

a cap element, mounted on the closure element, and rotatable relative to the closure element against the force of a return spring having a first end and a second end;

an angle of free travel which limits the range of movement of the return spring;

a first stop and a second stop, the return spring connected at the first end to a fastener that is fixed relative to the closure element and at the second end to a fastener on the cap element that is mobile relative to the fixed fastener, the return spring adapted to be tightened, by tension or compression, as the cap element is rotated through the angle of free travel, the return spring further being arranged between the closure element and the cap element such that the longitudinal axis of the return spring lies in a plane that intersects the axis of rotation of the tank cap, the return spring being disposed therein at an angle relative to the axis of rotation of the cap element.

2. The tank cap of claim 1, wherein the longitudinal axis of the return spring lies in a plane that is perpendicular to the axis of rotation of the cap element.

3. The tank cap of claim 1, wherein the closure element is essentially rotationally symmetric and has a pivot arranged in the center thereof about which the cap element is mounted, and wherein the return spring is guided at least in its tightened state in an arc around the pivot.

4. The tank cap according to claim 3, wherein a deflection sleeve is arranged to rotate about the pivot and the return spring is guided around the outer surface of the deflection sleeve to encourage uniform distribution of the tension load over the entire length of the return spring.

5. The tank cap of the claim 1, wherein the cap element has a guide pin protruding in the direction of the closure element, and a guide channel disposed in a top surface of the closure element and which guide channel is open to the cap element, the guide channel being in the form of a substantially circular arc in which the guide pin can travel, wherein the ends of the guide channel form the first stop and the second stop.

6. The tank cap of claim 5, wherein the closure element has a pivot and the cap element has an inner cap portion and an outer cap portion connected to the inner cap portion, the inner cap portion mounted about the pivot and having the guide pin, and the outer cap portion having the mobile fastener.

7. The tank cap of claim 1, wherein the return spring is a coil spring.

8. The tank cap of claim 1, wherein the return spring is formed from an elastic rubber band.

9. The tank cap of claim 1, wherein at least one additional spring is provided to support the return spring, and the at least one additional spring is a tension spring having a longitudinal axis which lies in a plane that is perpendicular to the axis of rotation of the cap element.

10. The tank cap of claim 9, wherein the at least one additional spring is arranged opposite to the return spring around the pivot.

11. The tank cap of claim 1, wherein the closure element has a lower neck insert adapted to be fastened onto the filler neck of the fuel tank, the neck insert having a locking sleeve, and a cap-bearing element mounted into and axially fixed in the locking sleeve but rotatable relative to the neck insert against the force of a spring-loaded ratchet connection, such that the ratchet connection prevents relative rotation between the neck insert and the cap bearing element when the tank cap is rotated in the opening direction, but permits relative rotation when the tank cap is rotated in the closing direction after a nominal torquing force has been surpassed.

12. The tank cap of claim 1, further comprising a holding band having a strap having a first end and a second end, the strap rotatably mounted on the tank cap at the first end and connected to a portion of the vehicle at the second end.

13. The tank cap of claim 12, wherein the holding band is affixed to an upper region of the neck insert which faces the cap element, and the upper region of the neck insert has a continuous recess in the region of the strap to secure against axial movement of the strap.

14. The tank cap of claim 1, wherein the spacing between the fixed fastener and the mobile fastener is great enough to permit the angle of free travel to be in the range of approximately 90° to approximately 270°.

15. The tank cap of claim 14, wherein the angle of free travel is approximately 180°.

* * * * *